United States Patent
Ranjan et al.

(10) Patent No.: US 10,415,901 B2
(45) Date of Patent: Sep. 17, 2019

(54) COUNTER-FLOW CERAMIC HEAT EXCHANGER ASSEMBLY AND METHOD

(71) Applicant: Hamilton Sundstrand Corporation, Windsor Locks, CT (US)

(72) Inventors: Ram Ranjan, West Hartford, CT (US); Eva Wong, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 314 days.

(21) Appl. No.: 15/262,888

(22) Filed: Sep. 12, 2016

(65) Prior Publication Data

US 2018/0073813 A1    Mar. 15, 2018

(51) Int. Cl.
  *F28F 21/04*  (2006.01)
  *B32B 3/26*  (2006.01)
  *F28D 9/00*  (2006.01)
  *F28F 3/08*  (2006.01)
  (Continued)

(52) U.S. Cl.
  CPC .............. *F28F 21/04* (2013.01); *B32B 3/266* (2013.01); *F28D 9/0062* (2013.01); *F28F 3/08* (2013.01); *F28F 7/02* (2013.01); *F28F 9/0221* (2013.01)

(58) Field of Classification Search
  CPC ... F28D 9/0062; F28F 3/08; F28F 7/02; F28F 9/0221; F28F 21/04; F28F 2255/18; B32B 3/266
  See application file for complete search history.

(56) References Cited

U.S. PATENT DOCUMENTS 3,272,260 A * 9/1966 Raub .................. F28F 7/02
                                                  165/164
4,017,347 A * 4/1977 Cleveland ............. B01J 35/04
                                                  148/DIG. 122
(Continued)

FOREIGN PATENT DOCUMENTS

CN          204255152 U      4/2015
EP           1544565 A2      6/2005
(Continued)

OTHER PUBLICATIONS

Extended European Search Report for EP Application No. 17180878.5, dated Jan. 15, 2018, 7 pages.

*Primary Examiner* — Devon Russell
(74) *Attorney, Agent, or Firm* — Kinney & Lange, P.A.

(57) ABSTRACT

A heat exchanger assembly embodiment includes a plurality of laminated ceramic tape layers having at least one hole surrounded by at least one tape remainder portion. The plurality of layers is arranged in a build direction defined parallel to a counter-flow plane. Each laminated ceramic tape layer is stacked and sintered to define a ceramic core section integrally formed with a first ceramic manifold and a second ceramic manifold. The ceramic core section of the assembly includes a plurality of spaced apart counter-flow plates stacked along a stacking direction normal to the counter-flow plane and the build direction, defining a plurality of flow passages parallel to the counter-flow plane. Each flow passage is in communication with the first manifold and the second manifold. A plurality of counter-flow fins is disposed in at least one of the plurality of flow passages, between adjacent ones of the plurality of counter-flow plates.

14 Claims, 7 Drawing Sheets

(A)

(B)

(C)

(D)

(51) Int. Cl.
*F28F 7/02* (2006.01)
*F28F 9/02* (2006.01)

(56) References Cited

U.S. PATENT DOCUMENTS

| | | | | |
|---|---|---|---|---|
| 4,265,302 | A * | 5/1981 | Forster | B28B 3/26 |
| | | | | 165/165 |
| 4,298,059 | A * | 11/1981 | Krauth | F28D 9/0068 |
| | | | | 165/166 |
| 4,746,479 | A * | 5/1988 | Hanaki | B28B 3/269 |
| | | | | 264/629 |
| 8,573,291 | B2 | 11/2013 | Vick | |
| 9,761,392 | B2 * | 9/2017 | Zacharias | H01H 33/10 |
| 2007/0221366 | A1 * | 9/2007 | Murayama | F28D 9/0037 |
| | | | | 165/166 |
| 2013/0174924 | A1 * | 7/2013 | Luo | F28F 9/0221 |
| | | | | 137/561 A |
| 2013/0186109 | A1 | 7/2013 | Atrey et al. | |
| 2013/0327513 | A1 * | 12/2013 | Franz | F28D 9/005 |
| | | | | 165/185 |
| 2015/0076685 | A1 * | 3/2015 | Abe | H01L 23/145 |
| | | | | 257/712 |
| 2017/0350660 | A1 * | 12/2017 | Kalsi | F28F 7/02 |
| 2018/0071950 | A1 * | 3/2018 | Richards | B28B 1/30 |

FOREIGN PATENT DOCUMENTS

| | | |
|---|---|---|
| JP | 2015188067 A | 10/2015 |
| WO | WO2012010620 A1 | 1/2012 |
| WO | WO2015067462 A1 | 5/2015 |

* cited by examiner

COUNTER-FLOW CERAMIC HEAT EXCHANGER ASSEMBLY AND METHOD

STATEMENT OF GOVERNMENT INTEREST

This invention was made with government support with Department of Energy NETL under Contract No. DE-FE0024066 with a Sub Contract with support from Ceralink, Inc. under Contract No. PO-C-005. The government has certain rights in this invention.

BACKGROUND

The disclosed subject matter relates generally to ceramic counter-flow heat exchangers, and more specifically, to ceramic counter-flow heat exchangers with increased thermal efficiency and resilience.

A typical air-to-air plate fin heat exchanger consists of a stack of inter-conductive air flow sections or passages. Hot air and cold air are forced through alternate passages (referred to as "hot" and "cold" passages, respectively, from time to time herein) in order to exchange heat. In a gas turbine blade disk cooling system, the hot air comes from the engine compressor before entering the turbine blade disks and then flows through bleed passages. The cold air is outside air and flows through ram passages in the engine fan ducts. These alternately stacked ram and bleed passages are joined together along a thermally conductive medium called the parting sheet or plate, and heat from the bleed passages is transmitted through the parting sheets/plates to the ram air flow. Of course, heat exchangers could receive air from other sources as well and the teachings herein are not limited to gas turbine management.

The hot and cold passages are similar and each includes an array of cooling fins and frames or closure bars which are positioned on the parting sheets/plates to define each passage. Frames or closure bars are placed along the edges of the passages to support the ends of the parting sheets/plates. In addition to supporting the ends of the parting sheets, these bars close off each passage, except where there is an inlet or an outlet. At and around the inlets and outlets the fins provide support for the parting sheets.

To fabricate a typical heat exchanger, the sheets/plates are stacked one on top of another with fins therebetween, to define alternating hot and cold passages. The assembly may then be placed in a vacuum furnace for brazing. During the brazing process the stack is squeezed so as to force the sheets and fins together.

The above description relates to typical heat exchangers that may be made with what are called "low temperature" materials. High temperature heat exchanger may be required where bleed air operating temperatures exceed the capability of conventional metals (e.g., low temperature materials). However, some aircraft or other situations may require compact heat exchangers including aircraft engine precoolers, gas power plant recuperators, and solid oxide fuel cell waste heat recovery, etc. that are in the high temperature range (T>800° C.). Widely used materials which can withstand temperature up to 700° C. include metal superalloys, such as stainless steel, Inconel, and Haynes alloys. Ceramic heat exchanger technology provides a solution to the high temperature requirements and may allow for inlet temperatures up to 900° C., but manufacturing limitations remained.

SUMMARY

An embodiment of a heat exchanger assembly includes a first plurality of laminated ceramic tape layers and a second plurality of laminated ceramic tape layers. The first plurality of laminated ceramic tape layers have at least one first hole surrounded by at least one first tape remainder portion. The first plurality of layers arranged in a build direction, parallel to a counter-flow plane, to define a first manifold section of the assembly. The second plurality of laminated ceramic tape layers, arranged adjacent to the first plurality of layers in the build direction, have at least one second hole surrounded by at least one second tape remainder portion. The second plurality of layers is arranged in the build direction to define a core section of the assembly in communication with the first manifold section of the assembly. The core section of the assembly includes a plurality of spaced apart counter-flow plates stacked along a stacking direction normal to the counter-flow plane and the build direction. The plurality of counter-flow plates defines a plurality of flow passages parallel to the counter-flow plane. A plurality of counter-flow fins is disposed in at least one of the plurality of flow passages, between adjacent ones of the plurality of counter-flow plates.

A heat exchanger assembly embodiment includes a plurality of laminated ceramic tape layers having at least one hole surrounded by at least one tape remainder portion. The plurality of layers is arranged in a build direction defined parallel to a counter-flow plane. Each laminated ceramic tape layer is stacked and sintered to define a ceramic core section integrally formed with a first ceramic manifold and a second ceramic manifold. The ceramic core section of the assembly includes a plurality of spaced apart counter-flow plates stacked along a stacking direction normal to the counter-flow plane and the build direction, defining a plurality of flow passages parallel to the counter-flow plane. Each flow passage is in communication with the first manifold and the second manifold. A plurality of counter-flow fins is disposed in at least one of the plurality of flow passages, between adjacent ones of the plurality of counter-flow plates.

An embodiment of a method for making a counter-flow heat exchanger assembly includes arranging a first plurality of laminated ceramic tape layers in a build direction to define a first manifold section of the assembly. The first plurality of stacked layers have at least one first hole surrounded by at least one first tape remainder portion, the build direction defined parallel to a counter-flow plane. A second plurality of laminated ceramic tape layers is arranged in the build direction to define a core section of the assembly adjacent to and in fluid communication with the first manifold section. At least some of the second plurality of laminated ceramic tape layers have at least one second hole surrounded by at least one second tape remainder portion. The core section of the assembly includes a plurality of counter-flow plates formed from the at least some of the second plurality of laminated ceramic tape layers having at least one second tape remainder portion, the plurality of counter-flow plates stacked along a stacking direction normal to the counter-flow plane and the build direction, and arranged to define a plurality of flow passages parallel to the counter-flow plane. A plurality of counter-flow fins is formed from the at least some of the second plurality of laminated ceramic tape layers having at least one second tape remainder portion. The plurality of counter-flow fins is disposed between adjacent ones of the plurality of counter-flow plates in at least one of the plurality of flow passages.

DETAILED DESCRIPTION

Generally, in embodiments according to this disclosure, a high temperature plate-fin counter-flow heat exchanger can be built by a layer-by-layer additive manufacturing process. In one embodiment, the process is a so-called Laminated Object Manufacturing (LOM) process. This can be done by stacking laminated tapes in a direction perpendicular to the plate-stacking direction (i.e., along the counter-flow plane) to form a green assembly, which is then fired to form a monolithic ceramic heat exchanger. The tapes can be cut prior to stacking so as to establish integrated header(s) and optionally, more complex fin shapes (e.g., offset strip fins, pin fins). With integrated headers, fewer material interfaces are required (e.g., with metal fasteners), reducing potential failure points around thermal/material interfaces, which maximizes the benefits of ceramic heat exchange media by increasing thermal efficiency and/or extending useful life.

Figure 1:
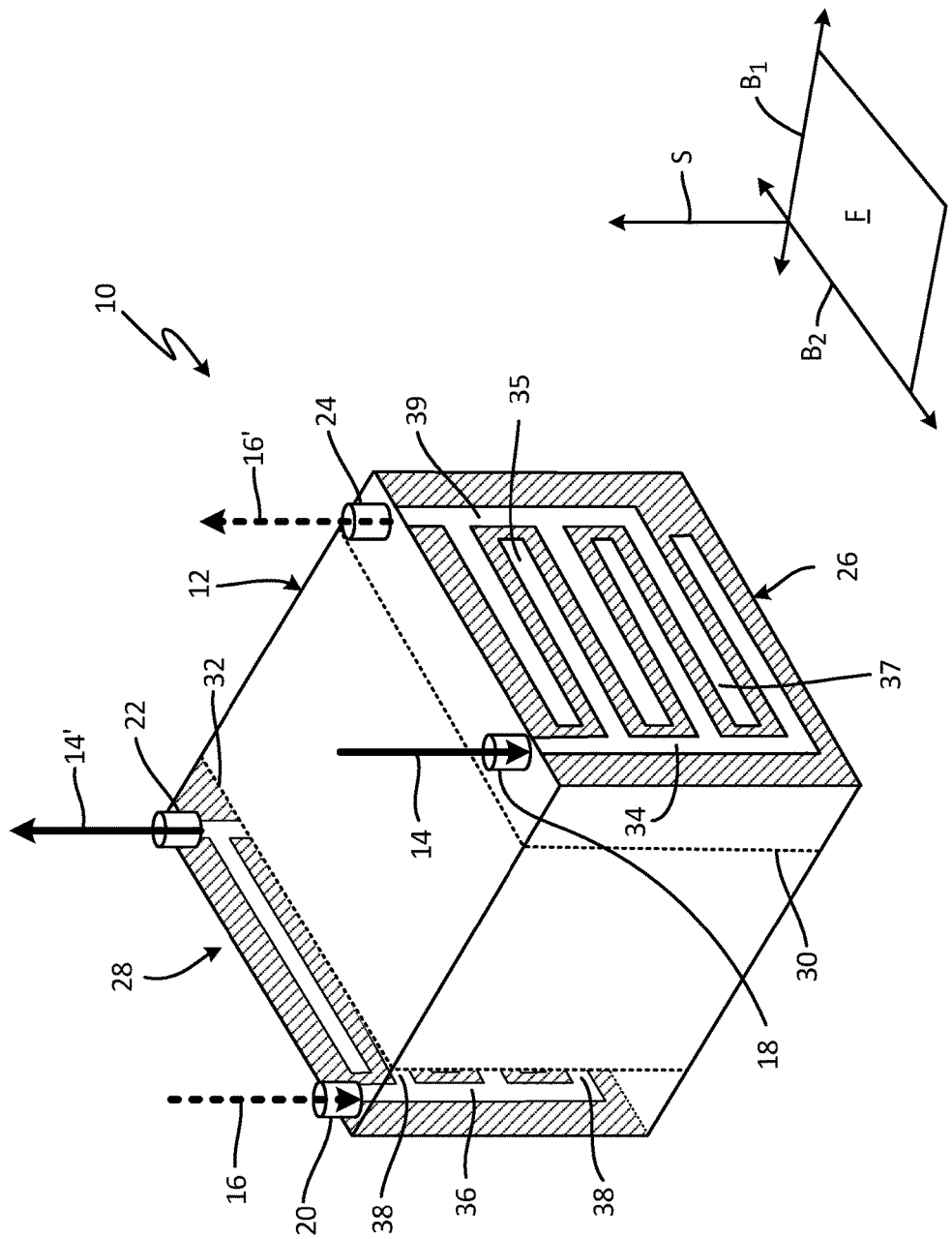
FIG. 1 is a schematic view of a counter-flow heat exchanger assembly.

FIG. 1 is a schematic diagram of a counter-flow heat exchanger assembly 10 and generally includes core assembly 12, first incoming fluid 14, first outgoing fluid 14', second incoming fluid 16, second outgoing fluid 16', first fluid inlet 18, second fluid inlet 20, first fluid outlet 22, second fluid outlet 24, first manifold 26, second manifold 28, first interface 30, second interface 32, first vertical inlet header 34, first horizontal inlet headers 35, second vertical inlet header 36, second horizontal outlet headers 37, second horizontal inlet headers 38, and second vertical outlet header 39.

Figure 5:
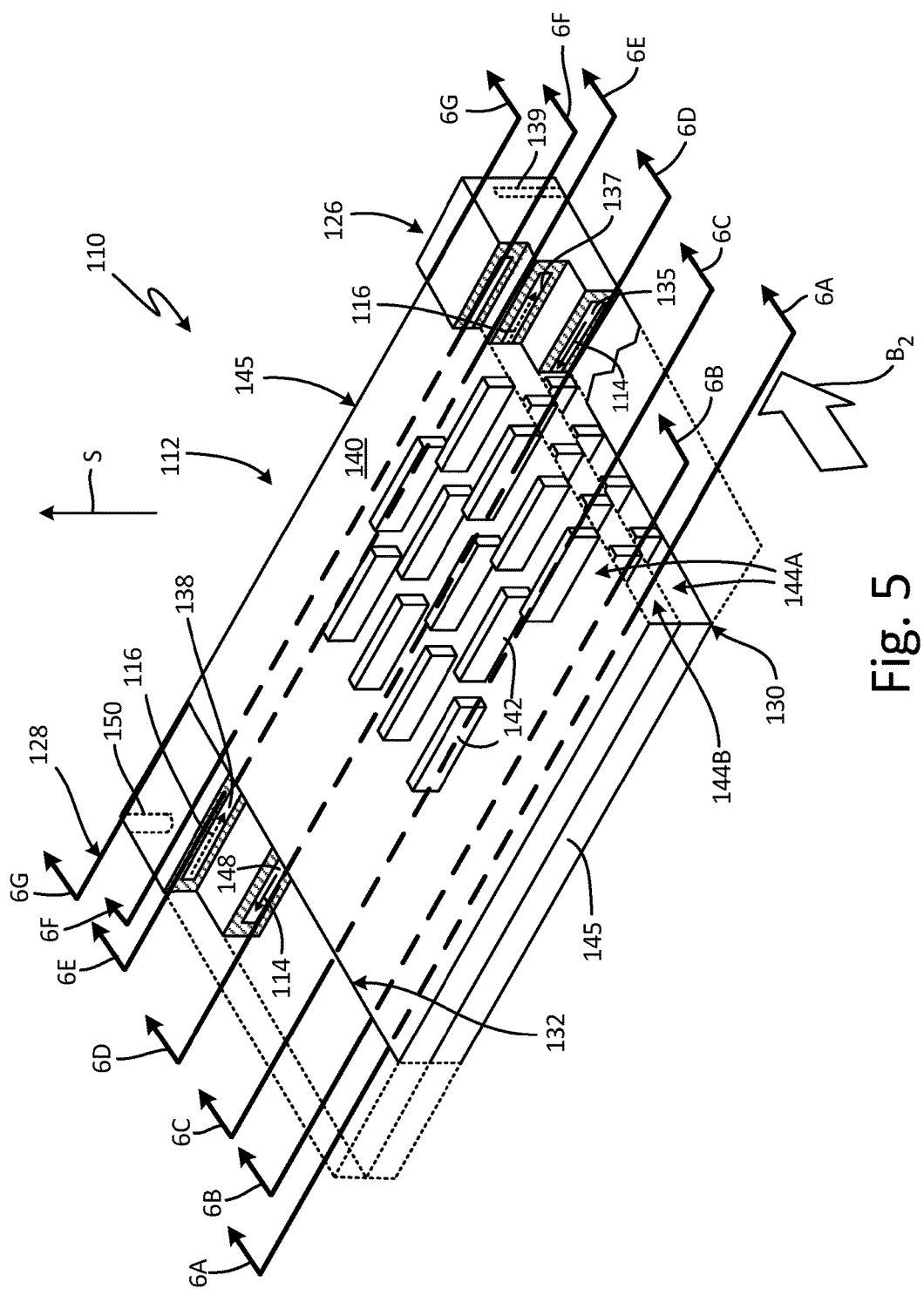
FIG. 5 illustrates a second example build direction for building a counter-flow heat exchanger assembly.
Figure 6:
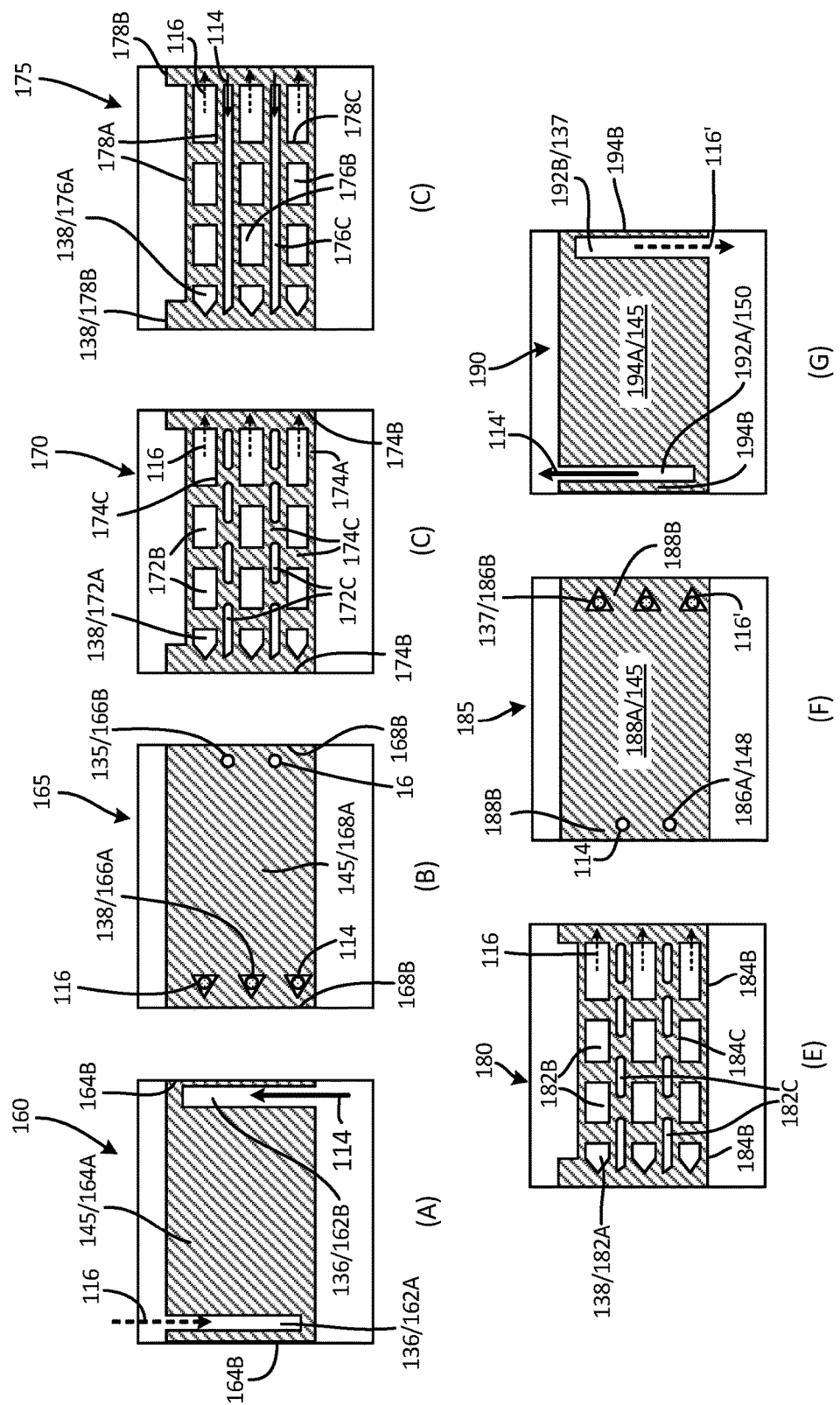
FIG. 6 shows individual tape layers for building the assembly in a second build direction identified in FIG. 5.

In a counter-flow heat exchanger, of the type shown in FIG. 1, first and second incoming fluids 14, 16 enter respective first and second fluid inlets 18 and 20. After passing in a heat exchange relationship through core assembly 12, the heat-exchanged first and second outgoing fluids 14' 16' exit via first and second fluid outlets 22, 24. Assembly 10 also includes first manifold 26 and second manifold 28, which are disposed in fluid communication with core assembly 12 at opposing sides thereof, meeting at respective first interface 30 and second interface 32. Though all shown at the "top" of assembly 10, one or more inlets and outlets can be disposed at a bottom or lateral side of manifolds 26, 28. One such example is shown in the embodiment of FIGS. 5 and 6.

Each pair of inlet and outlet (e.g., first inlet 18 and first outlet 22) are typically disposed at opposing ends or corners of the assembly 10, so as to allow fluids to be segregated for opposing (counter) flow into alternating passages between plates. As explained and illustrated in more detail in subsequent figures, counter-flow heat exchanger assembly 10 is defined such that the first and second fluids flow along planes which are generally parallel to counter-flow plane F. This is done by configuring core assembly 12 to have a plurality of plates arranged in the vertical stacking direction S, normal to counter-flow plane(s) F. With first manifold 26 on one side of core 12, and second manifold 28 on the other opposing side of core assembly 12, first and second fluids flow in opposing directions along alternating passages aligned with or parallel to counter-flow plane(s) F. There may be some localized lateral movement of the first and second fluids in each passage depending on the precise fin structure, but overall, fluid flow is in opposing directions to maximize heat transfer between first and second fluids 14, 16.

Certain walls of manifolds 26, 28 are cut away or rendered transparent in certain figures to illustrate aspects of the example assemblies and methods described herein. Generally, in a counter-flow heat exchanger such as those shown in the figures, first fluid 14 enters first inlet 18 and is distributed in first manifold 26 by first vertical inlet header 34, toward first horizontal inlet headers 35, each of which are in communication with corresponding passages in core assembly 12. First fluid 14 flows through core assembly 12 for heat exchange with second fluid 16, and is collected in first horizontal outlet headers (not visible in FIG. 1) for delivery to a first vertical outlet header (not visible in FIG. 1) before exiting as first fluid 14' from first outlet 22. Similarly, second fluid 16 enters second inlet 20, passes to second vertical inlet header 36 and is distributed to second horizontal inlet headers 38. Like first horizontal inlet headers 35, second horizontal inlet headers 38 are in communication with corresponding passages in core assembly 12 to flow toward first manifold 26. There, second fluid 16 is collected in second horizontal outlet headers 37 and directed to second vertical outlet header 38 before exiting as second fluid 16' from second outlet 24.

First fluid 14, 14' is delineated by a solid line to represent, e.g., a relatively cold fluid, while second fluid 16, 16' is delineated by a broken line to represent, e.g., a relatively hot fluid. It will be understood that the terms hot and cold are relative and can indeed be reversed in particular applications. However, to the extent possible, these identifiers will be adhered to in this description to maintain consistency. Similarly, identification of first and second manifolds 26, 28 can be reversed, particularly during the manufacturing process in order to simplify processing or optimize for a particular use.

As can be seen in FIG. 1, counter-flow plane(s) F encompass, or alternately can be said to be defined by, perpendicular first and second build directions $B_1$ and $B_2$. These build directions $B_1$ and $B_2$ indicate possible LOM counter-flow heat exchanger build directions according to the present disclosure. By conventional, bulk processing means, a plate and fin heat exchanger would be best built by stacking elements (e.g., plates and fins) of core assembly 14 in direction S, normal to counter-flow plane(s) F. However, aspects of ceramic materials suitable for high-temperature use and sufficient thermal conductivity make them difficult to process using conventional techniques as explained below.

Figure 2:
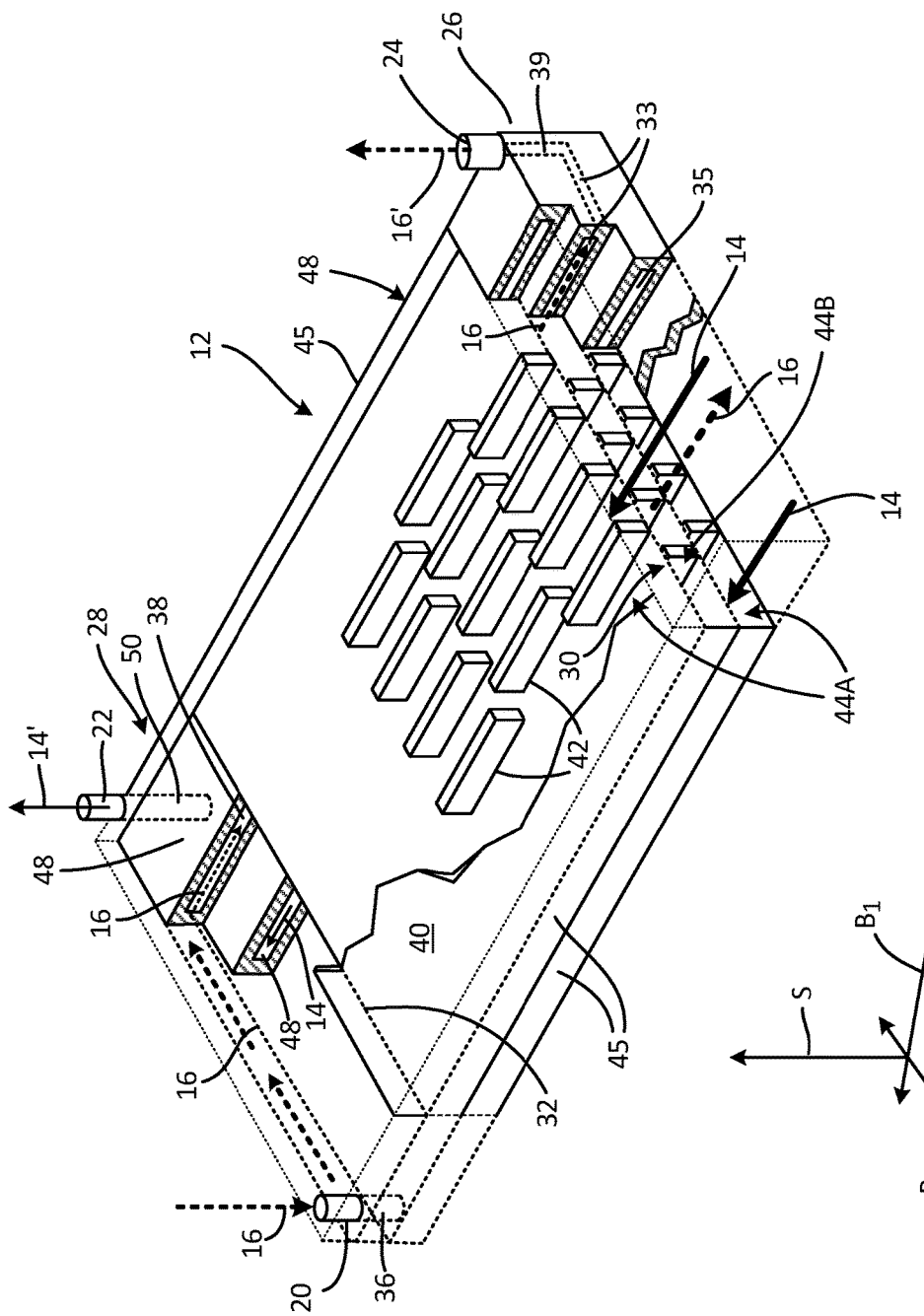
FIG. 2 shows a partial core including plates and a first example fin configuration in the counter-flow heat exchanger.

FIG. 2 shows a partial sectional view of heat exchanger assembly 10. Substantial portions of first and second manifolds 26, 28 are cut away to illustrate their relationship with core assembly 12. Remainders of first and second manifolds 26, 28 are shown in phantom. Some plates 40 are also removed for clarity.

Figure 7A:
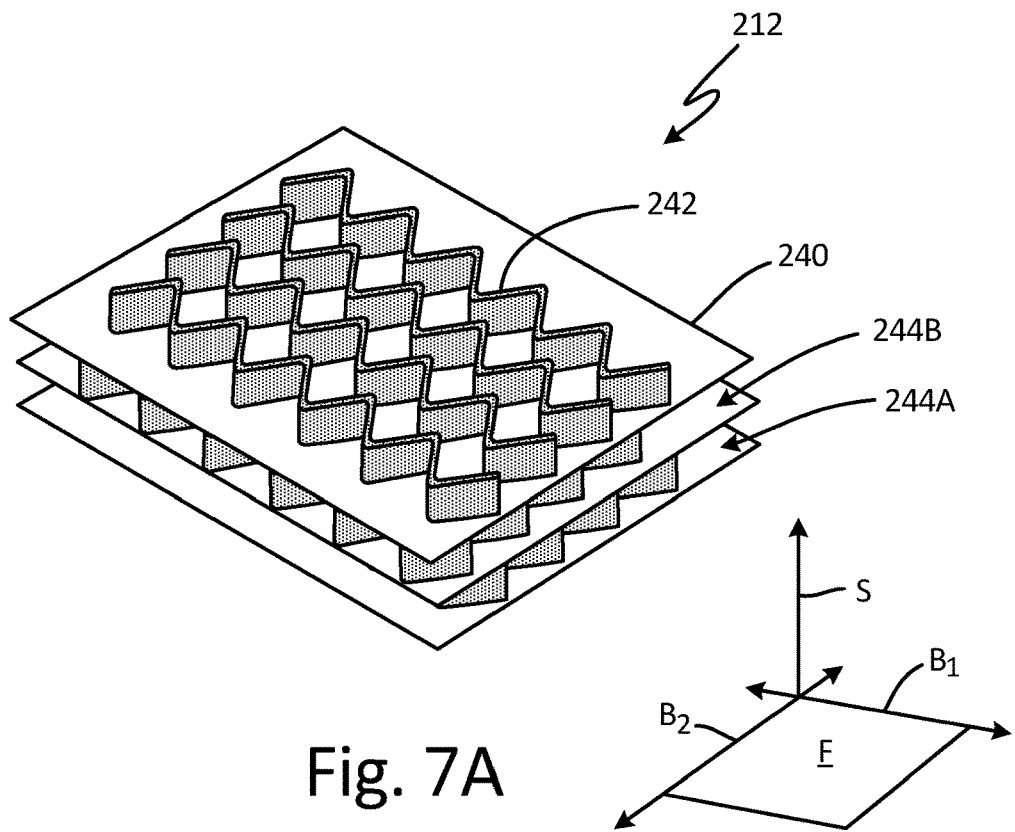
FIG. 7A shows a partial core including plates and a second example fin configuration in the counter-flow heat exchanger.
Figure 7B:
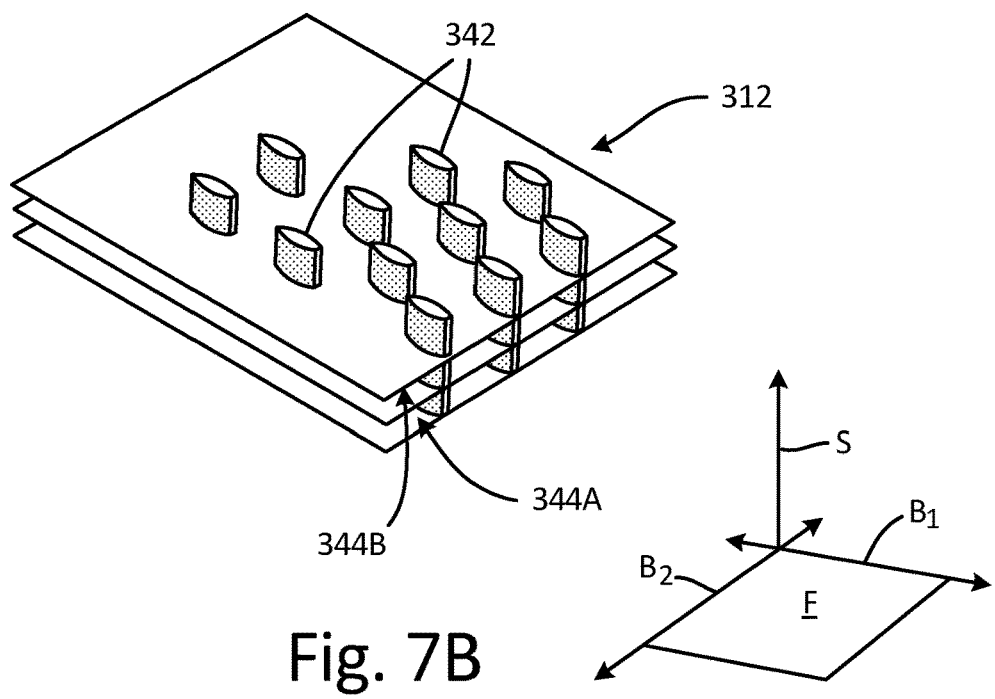
FIG. 7B shows a partial core including plates and a third example fin configuration in the counter-flow heat exchanger.

Core assembly 12 generally includes adjacent plates 40, and fins 42, defining alternating internal passages 44A, 44B therebetween. Fins 42 are partial offset fins, but it will be recognized that other fin shapes are possible with this method as described herein. Two additional non-limiting example fin geometries are shown in FIGS. 7A and 7B.

As shown here and in FIG. 1, headers disposed in first and second manifolds 26, 28 are in communication with passages 44A, 44B so that first and second fluids 14, 16 counter-flow along/parallel to plane F, as they flow from first manifold 26 to second manifold 28 or vice versa. In this example, first fluid 14 is e.g., an initially cold fluid, and second fluid 16 is, e.g., a relatively hot fluid, but can be reversed depending on a particular configuration or application of assembly 10.

As introduced in FIG. 1, first and second manifolds 26, 28 each include alternating inlet and outlet vertical headers on opposing corners, which are in communication with alternating inlet and outlet horizontal headers, which are in turn in communication with passages 44A, 44B. Passages 44A, 44B alternate in stacking direction S and are enclosed by one or more closure bars 45. As was shown in FIG. 1, first fluid 14 is distributed in first manifold 26 by first vertical inlet header 34, toward first horizontal inlet headers 35 (two shown in FIG. 2). Second fluid 16 enters second inlet 20, passes to second vertical inlet header 36 (shown in FIG. 1) and is distributed to second horizontal inlet header(s) 38. First horizontal inlet headers 35 are each in communication with corresponding passages 44A, while second horizontal inlet headers 38 are each in communication with corresponding second passages 44B in core assembly 12. Thus first fluid 14 flows through passages 44A in counter-flow heat exchange relationship with second fluid 16 flowing through passage(s) 44B. First fluid 14 then is collected in first horizontal outlet header(s) 48 for delivery to a first vertical outlet header 50 before exiting as first fluid 14' from first outlet 22. Similarly, second horizontal inlet header(s) 38 are in communication with corresponding passages 44B to flow toward first header 26 where second fluid 16 is collected in second horizontal outlet headers 37. It is then directed to second vertical outlet header 38 before exiting as second fluid 16' from second outlet 24.

In prior counter-flow heat exchangers, all-ceramic designs are non-manufacturable by the additive LOM process in the vertical (i.e., plate stacking) build direction. This is due, at least in part, to complex geometries required for manufacturing headers/manifolds, including difficulty in handling of thin and long strips in each tape layer and relatively wide openings required to effectively provide communication to and from the individual counter-flow passages. Thus, manifolds for vertically built counter-flow cores must be made separately from the core and subsequently joined mechanically. This creates material interfaces (e.g., metal/ceramic interface) which can have undesirable differences in thermal expansion and contraction. Further, mechanical processing of highly thermally conductive ceramics is difficult and expensive by itself.

In certain embodiments, heat exchanger assembly 10 can be at least part of a recuperator for a turbine engine combustor. As is known, a recuperator collects waste heat from the core and uses it to preheat compressed air, often increasing efficiency by several percentage points. With increased combustor temps, the hot side manifold has the hottest fluid and would flex with significant material differences and mechanical interfaces.

Figure 3:
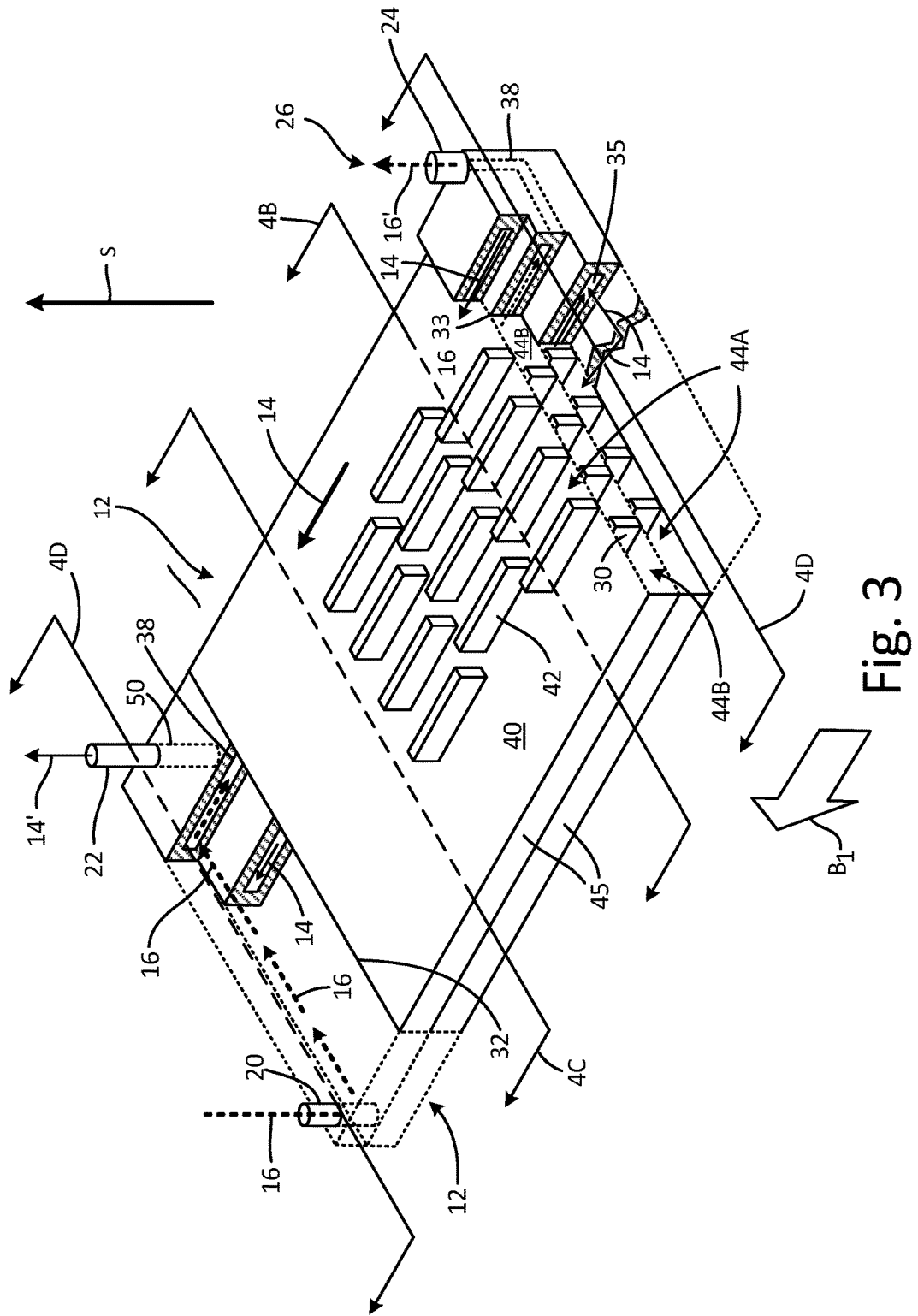
FIG. 3 illustrates one example build direction for building a counter-flow heat exchanger assembly.

FIG. 3 shows a partial section view of core section 12 to illustrate example laminated ceramic tape layers for an LOM process, identified at example planes 4A-4D through first manifold 26, core assembly 12, and second manifold 28.

Figure 4:
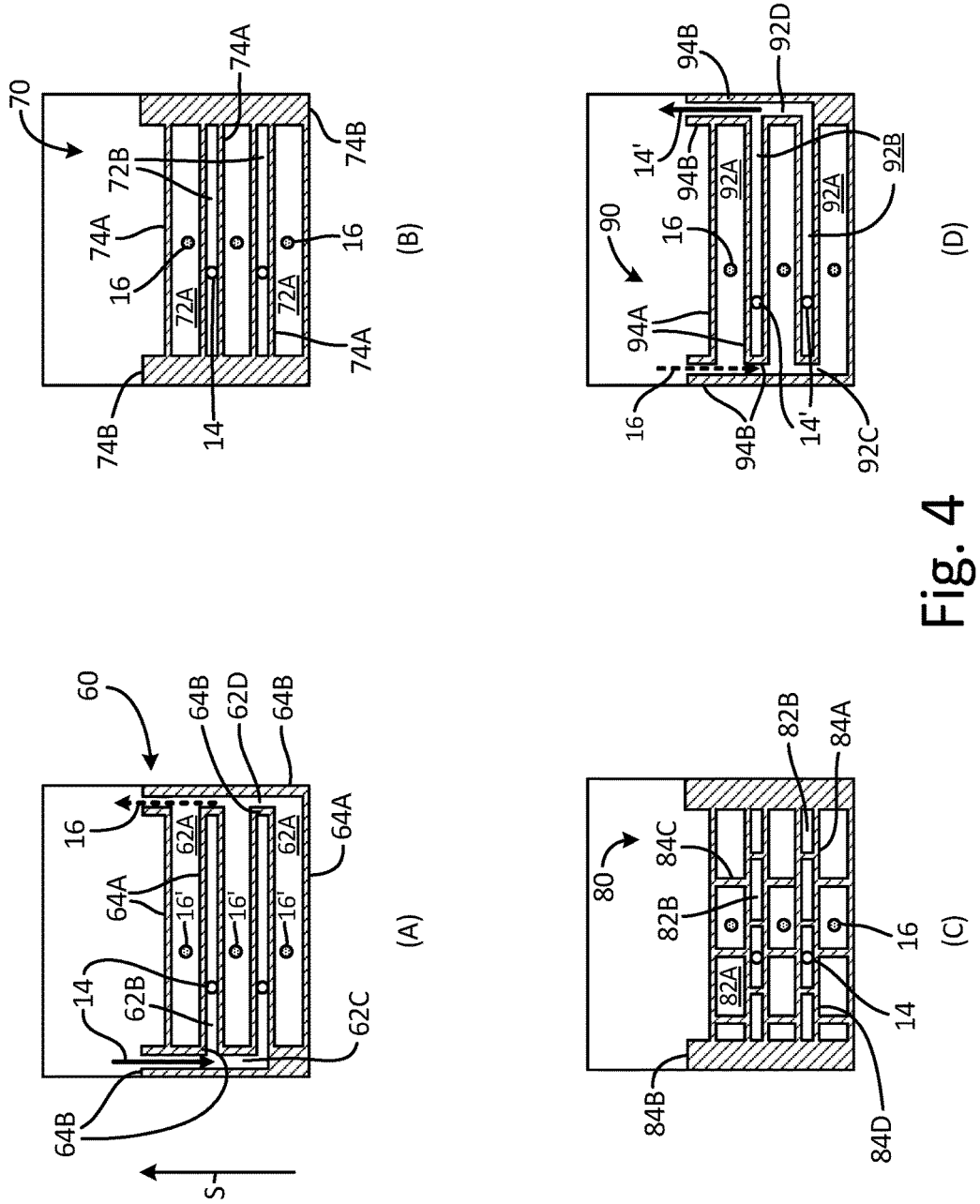
FIG. 4 shows individual tape layers for building the assembly in a first build direction identified in FIG. 3.

As shown here and in more detail in FIG. 4, heat exchanger assembly 10 includes a first plurality of laminated ceramic tape layers arranged and/or aligned in a build direction (here $B_1$) to define a first or second manifold section 26, 28. In embodiments herein, the tape layers are formed of ceramic. The tape layers can be formed from various materials, e.g., aluminum nitride, alumina, silicon nitride, etc. by tape casting process. The tape layers have at least one first hole surrounded by at least one first tape remainder portion. The at least one first hole defines a portion of the vertical and/or horizontal header (inlet and/or outlet), and the at least one first tape remainder portion can serve as a wall portion of the first or second manifold 26, 28. A second plurality of laminated ceramic tape layers can be arranged and/or aligned adjacent to the first plurality of laminated ceramic tape layers in the build direction (here, $B_1$ parallel to a counter-flow plane F).

The second plurality of layers are arranged in build direction $B_1$ to define core assembly 12 in communication with first or second manifold section 26, 28. Resulting core assembly 12 includes a plurality of spaced apart counter-flow plates 40 are stacked along a stacking direction S normal to counter-flow plane F and build direction $B_1$. Counter-flow plates 40 define a plurality of alternating counter-flow passages 44A, 44B parallel to counter-flow plane F. A plurality of counter-flow fins 42 is disposed in at least one of the plurality of flow passages 44A, 44B, between adjacent ones of the plurality of counter-flow plates 40. The second plurality of tape layers can have at least one second hole surrounded by at least one second tape remainder portion. The at least one second tape remainder portion can serve as a plate portion, wall portion, fin/rib portion, and/or closure bar portion while the at least one second hole defines open spaces in the plurality of passages not occupied by the plurality of counter-flow fins.

Building a cross-flow heat exchanger (as opposed to a counter-flow heat exchanger described herein) according to an LOM process has been done in direction S through addition of transverse fins supporting axial fins (see U.S. patent application Ser. No. 14/956,392 by Applicant Hamilton Sundstrand Corporation, which is incorporated herein by reference in its entirety). However, the more complex header/manifold structure required for a counter-flow heat exchanger, as well as more complex fin geometries, difficulties in machining and joining individual ceramic elements to suitable tolerances to minimize leakage, calls for a different approach.

To eliminate significant material differences and mechanical interfaces in the overall assembly, the first manifold and/or second manifold assembly can be integrally formed to a corresponding first end or second end of an integrally formed core assembly. Further, a third plurality of layers can be arranged to form a second manifold assembly. The second can optionally be formed integrally with the core like the first manifold, or can be formed separately and attached, depending on the relative expected temperatures of heat exchange fluids as explained above. As such, at least one of the first and second manifold sections 26, 28, and the core assembly 12 can withstand an inlet temperature of a first fluid or a second fluid of at least 800° C. (1472° F.).

FIG. 4 shows four example tape layers for use in an LOM process according to this disclosure. In image (A), a first plurality of laminated ceramic tape layers 60 are arranged and aligned in a build direction ($B_1$ in FIG. 3) to define first manifold section 26 of assembly 10. The first plurality of tape layers 60 have first holes 62A, 62B, 62C, 62D surrounded by first tape remainder portions 64A, 64B. First holes 62A, 62B correspond to alternating horizontal headers 35, 37 (shown in FIGS. 1-3), while first holes 62C, 62D correspond to vertical headers 34, 38 in first manifold 26. First tape remainder portions 64A form horizontal wall layers of first manifold 26 between horizontal headers 35, 37, and first tape remainder portions 64B form vertical wall layers of first manifold 26. Consistent with earlier figures, first incoming fluid 14 is identified, as well as second outgoing fluid 16'.

Image (B) shows laminated ceramic tape layer 70, one of a second plurality of ceramic tape layers which define a part of core assembly 14 adjacent to and in fluid communication with first manifold section 26 (shown in FIGS. 1-3). Laminated ceramic tape layer(s) 70 have second holes 72A, 72B surrounded by second tape remainder portions 74A, 74B. Second holes 72A, 72B correspond to alternating passages 44A, 44B (shown in FIGS. 1-3). Second tape remainder portions 74A define a plurality of counter-flow plates 40 (shown in FIGS. 2 and 3) stacked along a stacking direction S normal to the counter-flow plane F and the build direction $B_1$ (shown in FIGS. 1-3). Second tape remainder portions 74B define sidewalls and/or closure bars 45 (also shown in FIGS. 2 and 3). Consistent with earlier figures, first fluid 14 is identified, as well as second fluid 16.

Image (C) shows laminated ceramic tape layer 80, another of a second plurality of ceramic tape layers which define a part of core assembly 14. Laminated ceramic tape layer(s) 80 have second holes 82A, 82B surrounded by second tape remainder portions 84A, 84B, 84C, 84D. Second tape remainder portions 84A define a plurality of counter-flow plates 40 (shown in FIGS. 2 and 3) stacked along a stacking direction S normal to the counter-flow plane F and the build direction $B_1$ (shown in FIGS. 1-3). Second tape remainder portions 84B define sidewalls and/or closure bars 45 (also shown in FIGS. 2 and 3). Second holes 82A, 82B also correspond to alternating passages 44A, 44B (shown in FIGS. 1-3) but are interrupted by second tape remainder portions 84C, 84D. A plurality of counter-flow fins 42 (shown in FIGS. 2 and 3) are formed from second tape remainder portions 84C, 84D between second tape remainder portions 84A, 84B. Consistent with earlier figures, first fluid 14 is identified, as well as second fluid 16.

Laminated ceramic tape layers 70 and 80 are aligned in the build direction such that the corresponding second tape remainder portions 74A, 74B, 84A, 84B, 84C, 84D define the plurality of spaced apart counter-flow plates 40 and the plurality of counter-flow fins 42 shown in FIGS. 2 and 3. Similarly, second holes 72A, 72B, 84A, 84B, 84C, 84D align to define open spaces in the plurality of passages 44 not occupied by the plurality of counter-flow plates 40 and fins 42.

Once stacked in the build direction $B_1$ as shown in FIG. 3, at least the laminated ceramic tape layers 60, 70, 80 form a greenbody that can be sintered together to form first manifold section 26 integrally with the core 14, such that they can withstand an inlet temperature of a first fluid or a second fluid of at least 800° C. (1472° F.).

In image (D), laminated ceramic tape layer 90, one of a third plurality of laminated ceramic tape layers are arranged and aligned in build direction $B_1$ (in FIG. 3) to define second manifold section 28 of assembly 10. The third plurality of tape layers 90 have third holes 92A, 92B, 92C, 92D surrounded by third tape remainder portions 94A, 94B. First holes 92A, 92B correspond to alternating horizontal headers 38, 48 (shown in FIGS. 1-3), while third holes 92C, 92D correspond to vertical headers 36, 50 in second manifold 28. Third tape remainder portions 94A form horizontal wall layers of second manifold 28 between horizontal headers 38, 48, and first tape remainder portions 94B form vertical wall layers around vertical headers 36, 50 of second manifold 28. Consistent with earlier figures, first outgoing fluid 14' is identified, as well as second incoming fluid 16.

Laminated ceramic tape layers 90 can optionally be incorporated into the greenbody formed with laminated ceramic tape layers 60, 70, 80 so that second manifold section 28 also is integrally formed to an opposing side of the core 14. Alternatively, second manifold section 28 can be formed, with or without the use of laminated ceramic tape layers 90 and attached separately to the core.

FIGS. 5 and 6 illustrate a second example embodiment using laminated ceramic tape layers in an LOM process to form heat exchanger assembly 110. Example planes 6A-6G are taken progressively through heat exchanger assembly 110 in build direction $B_2$ to show how example laminated tape layers can form first manifold 126, core assembly 112, and second manifold 128. Build direction $B_2$ is generally perpendicular to both build direction $B_1$ and stacking direction S. Main fluid inlets and outlets are omitted from FIGS. 5 and 6 for clarity.

A plurality of laminated ceramic tape layers (shown in FIG. 6) are arranged and/or aligned in a build direction (here $B_2$) As in the previous example embodiment, the ceramic tape layers are formed of ceramic, e.g., aluminum nitride, alumina, silicon nitride, etc. by a tape casting process.

Like the previous example embodiment, first manifold 126 includes first vertical inlet header 134, first horizontal inlet headers 135, second horizontal outlet headers 137, and second vertical outlet header 139. Second manifold section 128 includes second vertical outlet header 136, second horizontal outlet headers 138, first horizontal outlet headers 148, and first vertical outlet header 150. Also like the previous example embodiment, core assembly 112 is integrally formed with one or both of first and second manifolds 126, 128 at first and second interfaces 132. Core assembly 112 includes a plurality of spaced apart counter-flow plates 140 stacked along a stacking direction S normal to the counter-flow plane and the build direction $B_2$. The plurality of counter-flow plates 140 define a plurality of flow passages 144A, 144B parallel to counter-flow plane F in communication with respective horizontal headers in manifolds 126, 128. A plurality of counter-flow fins 142 are disposed in at least one of the plurality of flow passages 144A, 144B, between adjacent ones of the plurality of counter-flow plates 140 to increase heat transfer area between first fluid 114 and second fluid 116. Flow passages 144A, 144B can be enclosed by side closure bars or walls 145.

However, with the arrangement and alignment of laminated ceramic tape layers along build direction $B_2$, perpendicular to the build direction $B_1$, some or all of the laminated ceramic tape layers can help to define more than one section of assembly 110 (i.e., a combination of first manifold 126, core assembly 112, and second manifold 128). The plurality of tape layers can have at least one hole surrounded by at least one tape remainder portion. Each tape layer can be cut or otherwise shaped so that each tape remainder portion can serve as one or more of a plate portion, wall portion, fin/rib portion, and/or closure bar/wall portion. Some of the holes in a particular laminated ceramic tape layer define open spaces in the plurality of passages 144A, 144B not occupied by the plurality of plates 140, counter-flow fins 142, and/or closure bars/walls 145. Other holes define portions of one or more headers in manifolds 126, 128. This is best seen in FIG. 6.

FIG. 6 shows seven example tape layers for use in an LOM process according to this disclosure. In image (A), laminated ceramic tape layers 160 are arranged and aligned in a build direction ($B_2$ in FIG. 5). Tape layer(s) 160 have holes 162A, 162B surrounded by tape remainder portions 164A, 164B. Holes 162A, 162B correspond to second vertical inlet header 136 in second manifold 128 and first vertical inlet header 134 in first manifold 126. Tape remainder portions 164A form closure bar/wall 145 between first manifold 126 and second manifold 128. Tape remainder portions 164B form vertical endwall layers of first manifold 126 and second manifold 128. Consistent with earlier figures, first incoming fluid 114 is identified, as well as second incoming fluid 116.

In image (B), laminated ceramic tape layers 165 have holes 166A, 166B surrounded by tape remainder portions 168A, 168B. Holes 166A, 166B correspond to second horizontal inlet header 138 in second manifold 128 and first horizontal inlet header 135 in first manifold 126. Tape remainder portions 168A form more of closure bar/wall 145 between first manifold 126 and second manifold 128. Tape remainder portions 168B form more of vertical endwall layers of first manifold 126 and second manifold 128.

In image (C), laminated ceramic tape layers 170 have holes 172A, 172B, 172C surrounded by tape remainder portions 174A, 174B, 174C. Holes 172A correspond to second horizontal inlet header 138 in second manifold 128, and can also form a portion of passages 144B (shown in FIG. 5). Most of passages 144B are defined by holes 172C, while passages 144A and optionally parts of first horizontal inlet header 135 are defined by holes 172B. Tape remainder portions 174A form plates 140, and tape remainder portions 174B form more of vertical endwall layers of first manifold 126 and second manifold 128. In addition, tape remainder portions 174C form one or more ribs 142 (shown in FIG. 5) in passages 144A and/or 144B.

In image (D), laminated ceramic tape layers 175 have holes 176A, 176B, 176C surrounded by tape remainder portions 178A, 178B, 178C. Holes 176A correspond to second horizontal inlet header 138 in second manifold 128, and can also form a portion of passages 144B (shown in FIG. 5). Most of passages 144B are defined by holes 176C, while passages 144A and optionally parts of first horizontal inlet header 135 are defined by holes 176B. Tape remainder portions 178A form plates 140, and tape remainder portions 178B form more of vertical endwall layers of first manifold 126 and second manifold 128. In addition, tape remainder portions 178C form one or more ribs 142 (shown in FIG. 5) in passages 144A and/or 144B.

In image (E), laminated ceramic tape layers 180 have holes 182A, 182B, 182C surrounded by tape remainder portions 184A, 184B, 184C. Holes 182A correspond to second horizontal inlet header 138 in second manifold 128, and can also form a portion of passages 144B (shown in FIG. 5). Most of passages 144B are defined by holes 182C, while passages 144A and optionally parts of first horizontal inlet header 135 are defined by holes 182B. Tape remainder portions 184A form plates 140, and tape remainder portions 184B form more of vertical endwall layers of first manifold 126 and second manifold 128. In addition, tape remainder portions 184C form one or more ribs 142 (shown in FIG. 5) in passages 144A and/or 144B.

In image (F), laminated ceramic tape layers 185 have holes 186A, 186B surrounded by tape remainder portions 188A, 188B. Holes 186A, 186B correspond to second horizontal outlet headers 148 in second manifold 128 and first horizontal outlet headers 137 in first manifold 126. Tape remainder portions 188A form part of a second closure bar/wall 145 between first manifold 126 and second manifold 128. Tape remainder portions 188B form more of vertical endwall layers of first manifold 126 and second manifold 128.

Finally in image (G), laminated ceramic tape layers 190 have holes 192A, 192B surrounded by tape remainder portions 194A, 194B. Holes 192A, 192B correspond to second vertical outlet header 150 in second manifold 128 and first vertical outlet header 139 in first manifold 126. Tape remainder portions 194A form closure bar/wall 145 between first manifold 126 and second manifold 128. Tape remainder portions 194B complete vertical endwalls of first manifold 126 and second manifold 128. Consistent with earlier figures, first outgoing fluid 114' is identified, as well as second outgoing fluid 116.

Thus far, the examples have been shown with respect to a counter-flow fin geometry being offset partial fins. This was exemplary only and the disclosed process and apparatus are not so limited. FIG. 7A shows a non-limiting alternative core assembly 212, which includes wavy fins 242 in alternating counter-flow passages 244A, 244B between plates 240. FIG. 7B shows another non-limiting example alternative core assembly 312 which includes pin fins 342 in alternating counter-flow passages 344A, 344B between plates 340. Combinations of these and other fin geometries, including partial height fins can be used in the same assembly, or even in the same passage depending on particular needs.

Discussion of Possible Embodiments

The following are non-exclusive descriptions of possible embodiments of the present disclosure.

An embodiment of a heat exchanger assembly includes a first plurality of laminated ceramic tape layers and a second plurality of laminated ceramic tape layers. The first plurality of laminated ceramic tape layers have at least one first hole surrounded by at least one first tape remainder portion. The first plurality of layers arranged in a build direction, parallel to a counter-flow plane, to define a first manifold section of the assembly. The second plurality of laminated ceramic tape layers, arranged adjacent to the first plurality of layers in the build direction, have at least one second hole surrounded by at least one second tape remainder portion. The second plurality of layers is arranged in the build direction to define a core section of the assembly in communication with the first manifold section of the assembly. The core section of the assembly includes a plurality of spaced apart counter-flow plates stacked along a stacking direction normal to the counter-flow plane and the build direction. The plurality of counter-flow plates defines a plurality of flow passages parallel to the counter-flow plane. A plurality of counter-flow fins is disposed in at least one of the plurality of flow passages, between adjacent ones of the plurality of counter-flow plates.

The assembly of the preceding paragraph can optionally include, additionally and/or alternatively, any one or more of the following features, configurations and/or additional components:

An assembly according to an exemplary embodiment of this disclosure, among other possible things includes a first plurality of laminated ceramic tape layers having at least one first hole surrounded by at least one first tape remainder portion, the first plurality of layers arranged in a build direction to define a first manifold section of the assembly, the build direction defined parallel to a counter-flow plane; and a second plurality of laminated ceramic tape layers arranged adjacent to the first plurality of laminated ceramic tape layers in the build direction, the second plurality of layers having at least one second hole surrounded by at least one second tape remainder portion, the second plurality of layers arranged in the build direction to define a core section of the assembly in communication with the first manifold section of the assembly; wherein the core section of the assembly comprises: a plurality of spaced apart counter-flow plates stacked along a stacking direction normal to the counter-flow plane and the build direction, the plurality of counter-flow plates defining a plurality of flow passages parallel to the counter-flow plane; and a plurality of counter-flow fins disposed in at least one of the plurality of flow passages, between adjacent ones of the plurality of counter-flow plates.

A further embodiment of the foregoing assembly, wherein the at least one second tape remainder portions are aligned in the build direction to define the plurality of spaced apart counter-flow plates and the plurality of counter-flow fins; and the at least one second hole defines open spaces in the plurality of passages not occupied by the plurality of counter-flow fins.

A further embodiment of any of the foregoing assemblies, wherein the core section further comprises: a plurality of ceramic closure bars disposed between adjacent ones of the plurality of plates so as to provide first flow passages for a first fluid alternating with second flow passages for a second fluid, the first and second passages placed in a counter-flow heat exchange relationship parallel to the counter-flow plane.

A further embodiment of any of the foregoing assemblies, wherein the first and second pluralities of laminated ceramic tape layers comprise a ceramic selected from a group consisting of: aluminum nitride, alumina, silicon nitride, mullite, and combinations thereof. A further embodiment of any of the foregoing assemblies, wherein the heat exchanger is at least part of a recuperator for a turbine engine combustor.

A further embodiment of any of the foregoing assemblies, wherein a geometry of the plurality of counter-flow fins is selected from: offset fins, pin fins, wavy fins, and combinations thereof.

A further embodiment of any of the foregoing assemblies, wherein the first manifold is integrally formed to a first end of the integrally formed core.

A further embodiment of any of the foregoing assemblies, and further comprising: a third plurality of laminated ceramic tape layers having at least one third hole surrounded by at least one third tape remainder portion, the third plurality of layers stacked in the build direction to define a second manifold section of the assembly; wherein the second manifold is integrally formed to a second opposing end of the core section.

A heat exchanger assembly embodiment includes a plurality of laminated ceramic tape layers having at least one hole surrounded by at least one tape remainder portion. The plurality of layers is arranged in a build direction defined parallel to a counter-flow plane. Each laminated ceramic tape layer is stacked and sintered to define a ceramic core section integrally formed with a first ceramic manifold and a second ceramic manifold. The ceramic core section of the assembly includes a plurality of spaced apart counter-flow plates stacked along a stacking direction normal to the counter-flow plane and the build direction, defining a plurality of flow passages parallel to the counter-flow plane. Each flow passage is in communication with the first manifold and the second manifold. A plurality of counter-flow fins is disposed in at least one of the plurality of flow passages, between adjacent ones of the plurality of counter-flow plates.

The assembly of the preceding paragraph can optionally include, additionally and/or alternatively, any one or more of the following features, configurations and/or additional components:

An assembly according to an exemplary embodiment of this disclosure, among other possible things includes a plurality of laminated ceramic tape layers having at least one hole surrounded by at least one tape remainder portion, the plurality of layers arranged in a build direction defined parallel to a counter-flow plane; wherein each of the plurality of laminated ceramic tape layers are stacked and sintered to define a ceramic core section integrally formed with a first ceramic manifold and a second ceramic manifold, the ceramic core section of the assembly comprising: a plurality of spaced apart counter-flow plates stacked along a stacking direction normal to the counter-flow plane and the build direction, the plurality of counter-flow plates defining a plurality of flow passages parallel to the counter-flow plane, each flow passage in communication with the first manifold and the second manifold; and a plurality of counter-flow fins disposed in at least one of the plurality of flow passages, between adjacent ones of the plurality of counter-flow plates.

A further embodiment of the foregoing assembly, wherein the core section further comprises: a plurality of ceramic closure bars disposed between adjacent ones of the plurality of plates so as to provide first flow passages for a first fluid alternating with second flow passages for a second fluid, the first and second passages placed in a counter-flow heat exchange relationship parallel to the counter-flow plane.

A further embodiment of any of the foregoing assemblies, wherein the plurality of laminated ceramic tape layers comprise a ceramic selected from a group consisting of: aluminum nitride, alumina, silicon nitride, mullite, and combinations thereof.

A further embodiment of any of the foregoing assemblies, wherein the heat exchanger is at least part of a recuperator for a turbine engine combustor.

A further embodiment of any of the foregoing assemblies, wherein a geometry of the plurality of counter-flow fins is selected from: offset fins, pin fins, wavy fins, and combinations thereof.

An embodiment of a method for making a counter-flow heat exchanger assembly includes arranging a first plurality of laminated ceramic tape layers in a build direction to define a first manifold section of the assembly. The first plurality of stacked layers have at least one first hole surrounded by at least one first tape remainder portion, the build direction defined parallel to a counter-flow plane. A second plurality of laminated ceramic tape layers is arranged in the build direction to define a core section of the assembly adjacent to and in fluid communication with the first manifold section. At least some of the second plurality of laminated ceramic tape layers have at least one second hole surrounded by at least one second tape remainder portion. The core section of the assembly includes a plurality of counter-flow plates formed from the at least some of the second plurality of laminated ceramic tape layers having at least one second tape remainder portion, the plurality of counter-flow plates stacked along a stacking direction normal to the counter-flow plane and the build direction, and arranged to define a plurality of flow passages parallel to the counter-flow plane. A plurality of counter-flow fins is formed from the at least some of the second plurality of laminated ceramic tape layers having at least one second tape remainder portion. The plurality of counter-flow fins is disposed between adjacent ones of the plurality of counter-flow plates in at least one of the plurality of flow passages.

The method of the preceding paragraph can optionally include, additionally and/or alternatively, any one or more of the following features, configurations and/or additional components:

A method according to an exemplary embodiment of this disclosure, among other possible things includes arranging a first plurality of laminated ceramic tape layers in a build direction to define a first manifold section of the assembly, the first plurality of stacked layers having at least one first hole surrounded by at least one first tape remainder portion, the build direction defined parallel to a counter-flow plane; and arranging a second plurality of laminated ceramic tape layers in the build direction to define a core section of the assembly adjacent to and in fluid communication with the first manifold section of the assembly, at least some of the second plurality of laminated ceramic tape layers having at least one second hole surrounded by at least one second tape remainder portion; wherein the core section of the assembly comprises: a plurality of counter-flow plates formed from the at least some of the second plurality of laminated ceramic tape layers having at least one second tape remainder portion, the plurality of counter-flow plates stacked along a stacking direction normal to the counter-flow plane and the build direction, and arranged to define a plurality of flow passages parallel to the counter-flow plane; and a plurality of counter-flow fins formed from the at least some of the second plurality of laminated ceramic tape layers having at least one second tape remainder portion, the plurality of counter-flow fins disposed between adjacent ones of the plurality of counter-flow plates in at least one of the plurality of flow passages.

A further embodiment of the foregoing method, and further comprising: aligning the at least one second tape remainder portions in the build direction to define the plurality of spaced apart counter-flow plates and the plurality of counter-flow fins; and aligning the at least one second holes defining open spaces in the plurality of passages not occupied by the plurality of counter-flow fins.

A further embodiment of any of the foregoing methods, further comprising: sintering at least the first manifold section and the core section such that the first manifold section and the core section can withstand an inlet temperature of a first fluid or a second fluid of at least 800° C. (1472° F.).

A further embodiment of any of the foregoing methods, wherein the first manifold section is integrally formed to a first end of the integrally formed core.

A further embodiment of any of the foregoing methods, and further comprising: arranging a third plurality of laminated ceramic tape layers in the build direction stacked to define a second manifold section of the assembly, the third plurality of laminated ceramic tape layers having at least one third hole surrounded by at least one third tape remainder portion; and integrally forming the second manifold section to a second opposing end of the core section.

A further embodiment of any of the foregoing methods, wherein the first and second pluralities of laminated ceramic tape layers comprise a ceramic selected from a group consisting of: aluminum nitride, alumina, silicon nitride, mullite, and combinations thereof.

A further embodiment of any of the foregoing methods, wherein a geometry of the plurality of counter-flow fins is selected from: offset fins, pin fins, wavy fins, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A green assembly suitable for forming a monolithic heat exchanger assembly, the green assembly comprising:
   a first plurality of laminated ceramic tape layers having a plurality of first tape remainder portions partially defining at least two, perpendicular first holes, the plurality of first tape remainder portions comprising at least one unitary horizontally extending portion and vertically extending portion, wherein the first plurality of layers are arranged in a build direction to define a first green manifold section, the build direction defined parallel to a counter-flow plane; and
   a second plurality of laminated ceramic tape layers arranged adjacent to the first plurality of laminated ceramic tape layers in the build direction, the second plurality of layers having a plurality of second tape remainder portions partially defining at least one second hole, the plurality of second tape remainder portions comprising at least one unitary horizontally extending portion and vertically extending portion, wherein the second plurality of layers are arranged in the build direction to define a green core section in communication with the first green manifold section;
   wherein the green core section of the comprises:
   a plurality of spaced apart counter-flow plates stacked along a stacking direction normal to the counter-flow plane and the build direction, the plurality of counter-flow plates defining a plurality of flow passages parallel to the counter-flow plane; and
   a plurality of counter-flow fins disposed in at least one of the plurality of flow passages, between adjacent ones of the plurality of counter-flow plates.

2. The green assembly of claim 1, wherein:
   the plurality of second tape remainder portions are aligned in the build direction to define the plurality of spaced apart counter-flow plates and the plurality of counter-flow fins; and
   the at least one second hole defines open spaces in the plurality of passages not occupied by the plurality of counter-flow fins.

3. The green assembly of claim 1, wherein the green core section further comprises:
   a plurality of ceramic closure bars disposed between adjacent ones of the plurality of plates so as to provide first flow passages for a first fluid alternating with second flow passages for a second fluid, the first and second passages placed in a counter-flow heat exchange relationship parallel to the counter-flow plane.

4. The green assembly of claim 1, wherein the first and second pluralities of laminated ceramic tape layers comprise a ceramic selected from a group consisting of: aluminum nitride, alumina, silicon nitride, mullite, and combinations thereof.

5. The green assembly of claim 1, wherein a geometry of the plurality of counter-flow fins is selected from: offset fins, pin fins, wavy fins, and combinations thereof.

6. The green assembly of claim 1, wherein the first green manifold is integrally formed to a first end of the integrally formed green core.

7. The green assembly of claim 6, and further comprising:
a third plurality of laminated ceramic tape layers having a plurality of third tape remainder portions partially defining at least two, perpendicular third holes, the plurality of third tape remainder portions comprising at least one unitary horizontally extending portion and vertically extending portion, wherein the third plurality of layers are stacked in the build direction to define a second green manifold section;
wherein the second green manifold is integrally formed to a second opposing end of the green core section.

8. A method for making a counter-flow heat exchanger assembly, the method comprising:
arranging a first plurality of laminated ceramic tape layers in a build direction to define a first manifold section of the assembly, the first plurality of stacked layers having a plurality of first tape remainder portions partially defining at least two, perpendicular first holes, the plurality of first tape remainder portions comprising at least one unitary horizontally extending portion and vertically extending portion, the build direction defined parallel to a counter-flow plane; and
arranging a second plurality of laminated ceramic tape layers in the build direction to define a core section of the assembly adjacent to and in fluid communication with the first manifold section of the assembly, at least some of the second plurality of laminated ceramic tape layers having a plurality of second tape remainder portions partially defining at least one second hole, the plurality of second tape remainder portions comprising at least one unitary horizontally extending portion and vertically extending portion;
wherein the core section of the assembly comprises:
a plurality of counter-flow plates formed from the at least some of the second plurality of laminated ceramic tape layers having at least one second tape remainder portion, the plurality of counter-flow plates stacked along a stacking direction normal to the counter-flow plane and the build direction, and arranged to define a plurality of flow passages parallel to the counter-flow plane; and
a plurality of counter-flow fins formed from the at least some of the second plurality of laminated ceramic tape layers having at least one second tape remainder portion, the plurality of counter-flow fins disposed between adjacent ones of the plurality of counter-flow plates in at least one of the plurality of flow passages.

9. The method of claim 8, and further comprising:
aligning the at least one second tape remainder portions in the build direction to define the plurality of spaced apart counter-flow plates and the plurality of counter-flow fins; and
aligning the at least one second holes defining open spaces in the plurality of passages not occupied by the plurality of counter-flow fins.

10. The method of claim 8, further comprising:
sintering at least the first manifold section and the core section such that the first manifold section and the core section can withstand an inlet temperature of a first fluid or a second fluid of at least 800° C. (1472° F.).

11. The method of claim 8, wherein the first manifold section is integrally formed to a first end of the integrally formed core.

12. The method of claim 11, and further comprising:
arranging a third plurality of laminated ceramic tape layers in the build direction stacked to define a second manifold section of the assembly, the third plurality of laminated ceramic tape layers having at least one third hole surrounded by at least one third tape remainder portion; and
integrally forming the second manifold section to a second opposing end of the core section.

13. The method of claim 8, wherein the first and second pluralities of laminated ceramic tape layers comprise a ceramic selected from a group consisting of: aluminum nitride, alumina, silicon nitride, mullite, and combinations thereof.

14. The method of claim 8, wherein a geometry of the plurality of counter-flow fins is selected from: offset fins, pin fins, wavy fins, and combinations thereof.

* * * * *